United States Patent Office 3,374,223
Patented Mar. 19, 1968

3,374,223
CRYSTALLINE SODIUM 5'-GUANYLATE PENTAHYDRATE AND METHOD OF PRODUCING THE SAME
Saburo Senoo, Tokyo, Toshio Kato, Omiya-shi, and Kenji Sato, Tokyo, Japan, assignors to Asahi Kasei Kogyo Kabushiki Kaisha, Osaka, Japan, a corporation of Japan
No Drawing. Filed Oct. 19, 1964, Ser. No. 409,344
Claims priority, application Japan, Oct. 19, 1963, 38/55,684
4 Claims. (Cl. 260—211.5)

This invention relates to a novel crystalline sodium 5'-guanylate pentahydrate and a method for producing the same.

It has been well known that 5'-guanylic acid has a taste enhancing property. For the purpose of using this material in a seasoning, the sodium salt has been selected. This is because of the fact that sodium 5'-guanylate has a high solubility in water and a particularly superior taste enhancing property. However it is considerably difficult to produce 5'-sodium guanylate of high purity. Since it has, as above-mentioned, extremely high solubility in water and it is in itself, hardly crystallizable, it is difficult to separate highly pure crystals directly from a mother liquor. Consequently, the following method has been heretofore adopted to obtain pure sodium 5'-guanylate; 5'-guanylic acid in a reaction mixture is isolated and separated from other impurities in the form of a barium salt and it is converted to sodium 5'-guanylate by a suitable method, as for example, by the addition to a reaction mixture containing 5'-guanylic acid, of a solution of barium salt such as barium chloride or the like and inorganic barium salt which precipitates, is removed by filtration. When a large amount of a water soluble solvent such as acetone, methanol or the like is added to the filtrate, barium salt of 5'-guanylic acid is precipitated which is collected by filtration. The resulting barium salt of 5'-guanylic acid is then converted to sodium salt by a suitable method e.g. by ion exchange reaction with ion exchange resins.

There is no doubt that the purity of the intermediate, barium 5'-guanylate has a substantial effect upon the purity of the sodium 5'-guanylate obtained by ion exchange reaction in the above-mentioned method for producing sodium 5'-guanylate. However barium 5'-guanylate obtained in this case is an amorphous, i.e. a non-crystalline precipitate. As a natural property of precipitation by the addition of organic solvent, the simultaneous precipitation of impurities cannot be avoided in this case. Accordingly purification of 5'-guanylic acid is required according to the circumstances. In order to meet this requirement, the resultant crude barium guanylate is dissolved in water, and a large amount of water soluble solvent is added to the above-mentioned solution to precipitate barium guanylate. This recrystallization method is repeated as many times as required.

In short, the separation of barium 5'-guanylate from impurities is not always effective and the purity of the resulting barium 5'-guanylate is not satisfactory with the isolation and purification method of barium 5'-guanylate which is characterized in adding a large amount of water soluble solvent.

As regards the composition of barium 5'-guanylate obtained by the above-mentioned purification method via recrystallization, there is a description in the Journal of American Chemical Society vol. 79 p. 3747 (1957) and vol. 83 p. 159 (1961). According to the analytical results, the former reports the existence of 8 molecules of crystallization water and the latter reports of 9 molecules of crystallization water.

An object of the present invention is to provide a method for producing crystalline barium 5'-guanylate containing a smaller amount of crystallization water than conventional salts containing 8 or 9 molecules of crystallization water. Another object of the present invention is to provide a method for producing barium 5'-guanylate which has various advantages in isolation, purification, transportation, handling and the like. A further object of the present invention is to provide such advantageous barium salt as crystalline barium 5'-guanylate containing 5 molecules of crystallization water.

These and other objects are attained by the present invention, according to which a super-saturated aqueous solution of barium 5'-guanylate is cooled thereby to yield crystalline salt possessing 5 molecules of crystallization water.

That is, the conventional methods for obtaining barium 5'-guanylate by separation or purification, for example, by a method for obtaining barium 5'-guanylate as a precipitate by adding inorganic barium ion to a solution containing barium 5'-guanylate, or reprecipitation of barium 5'-guanylate by adding a water miscible solvent such as alcohol, do not provide a means for obtaining crystalline barium 5'-guanylate. On the other hand, we have now found that brilliant white columnar crystals of novel barium 5'-guanylate pentahydrate are obtained by adding seed crystals of pure barium 5'-guanylate pentahydrate to a supersaturated solution of barium 5'-guanylate the pH of which is adjusted and then allowing the solution to stand at a low temperature for a long period of time. Details of the present invention will be given more fully hereinafter. The present invention utilizes the solubility difference of barium 5'-guanylate in water in accordance of temperature difference. The present invention is characterized in that crystalline barium 5'-guanylate pentahydrate is crystallized out by cooling a hot, concentrated aqueous solution of barium 5'-guanylate, adding seed crystals of barium 5'-guanylate pentahydrate to the resulting supersaturated barium 5'-guanylate solution, and keeping the said solution at a low temperature range of from 50° C. to the freezing point of the solution. The temperature range is an important and indispensable condition for crystallizing out the barium 5'-guanylate pentahydrate.

The shift from the high temperature range to the low temperature range of the solution is generally preferably carried out slowly to obtain high purity crystals but even when it is carried out quickly, there will be no harm so long as the solution does not contain a particularly large amount of impurities.

As regards the concentration of barium 5'-guanylate soluiton, any concentration will be suitable so long as the crystals of barium 5'-guanylate can be precipitated at that concentration when the solution is brought to the low temperature range. However, in general 1.5 percent to 0.3 percent is suitable.

As a solution used in the present invention containing barium 5'-guanylate, it is possible to use a reaction liquid which is obtained as the result of synthesis, however, an aqueous solution prepared by dissolving once isolated barium 5'-guanylate is also usable. Further it is also possible to use a solution prepared by dissolving a relatively impure, water soluble salt of 5'-guanylic acid which is difficult to purify e.g. such as sodium salt, potassium salt, ammonium salt or the like in water and adding barium acetate. Needless to say, a solution of barium 5'-guanylate prepared by adding a compound capable of producing barium ion to a solution containing 5'-guanylic acid can also be used.

In the practice of the present method, the addition of a small amount of water soluble solvent such as alcohol or acetone may be possible but the addition of a large amount of such a solvent is an obstacle in forming crystalline barium 5'-guanylate.

Highly pure, crystalline barium 5'-guanylate obtained in the present invention can be converted into sodium 5'-guanylate by a customary method of metal ion exchange. The sodium salt thus produced has a high purity as is, and can be used for preparing seasonings or the like without using such troublesome purification operations as reprecipitation or recrystallization.

Since barium 5'-guanylate pentahydrate can be precipitated from a solution containing barium 5'-guanylate readily in the crystalline form according to the present invention, there is no need of adding an expensive solvent as required in the conventional methods, and no possibility exists of coprecipitation of impurities in the present method. Furthermore since the resulting barium 5'-guanylate is of crystalline form having high purity and containing a smaller amount of crystallization water, it is advantageous in transportation and use.

In order that those skilled in the art may more fully understand the nature of our invention and the method of carrying it out, the following examples are given.

Example 1

0.668 g. of sodium 5'-guanylate was dissolved in 10 ml. of water. To this solution, 1.8 ml. of 2 normal barium acetate solution was added and left to stand. Precipitated barium 5'-guanylate was collected by filtration and introduced into 80 ml. of hot water. The dissolution was enhanced by agitation. Then the solution was filtered while hot, freed from insoluble matter and left to stand at room temperature overnight. When precipitated barium 5'-guanylate was collected by filtration and dried at room temperature, in vacuo, over phosphorus pentoxide for 24 hours, there was obtained 0.726 g. of white needle crystals. The analytical data was as follows;

Values calculated for $C_{10}H_{12}N_5O_8PBa \cdot 5H_2O$: C, 20.40; H, 3.76; N, 11.89. Found: C, 20.72, 20.90; H, 4.09, 4.05; N, 11.47, 11.44.

245.51 mg. of this substance was dried over phosphorus pentoxide at a reduced pressure, at 110° C. for 24 hours, whereby the weight was found to be reduced by 35.54 mg. This corresponds to 14.48 percent water content.

Values calculated for $C_{10}H_{12}N_5O_8PBa$: C, 24.09; H, 2.42. Found: C, 24.18, 24.17; H, 2.94, 2.96.

Example 2

A solution having a pH of 8.5 and containing barium 5'-guanylate obtained from 10 g. of 2',3'-O-isopropylidene guanosine according to the report of Chambers et al. (J. Am. Chem. Soc., vol. 79, p. 3747 (1957)), was concentrated to half of the original volume, filtered while hot and after having a small amount of barium 5'-guanylate crystal added as seeds the solution was allowed to stand overnight whereby 5.4 g. of crystalline barium 5'-guanylate was obtained.

Example 3

9.5 g. of sodium 5'-guanylate having a purity of 78% by weight and prepared according to the method of D.R.P. 1,119,278 was dissolved in 50 ml. of water and 19 ml. of 2 normal barium acetate was added. Precipitated crude barium 5'-guanylate was collected by filtration and dissolved in 1.8 l. of hot water while being agitated. Freed from insoluble matter by filtration, the resulting solution was allowed to cool after the addition of seeds of barium 5'-guanylate whereby 8.5 g. of white pillar-shaped crystal of barium 5'-guanylate was obtained. This crystal was suspended in 200 ml. of water, added with Amberlite IR120 ($H^+$ type) and after being agitated for one hour; the suspension was filtered. When the resulting filtrate was adjusted to pH 7.5 by adding diluted sodium hydroxide solution and concentrated by evaporation to dryness, 5.4 g. of white sodium 5'-guanylate was obtained. It was found by analysis that this material had a purity of 96 percent.

What is claimed is:

1. A method for producing crystalline barium 5'-guanylate pentahydrate comprising cooling a hot aqueous solution of barium 5'-guanylate to a temperature in a range from 50° C. to the freezing point of said solution to form a supersaturated solution of barium 5'-guanylate pentahydrate, adding seed crystals of barium 5'-guanylate pentahydrate to the thusly formed supersaturated solution, and maintaining the supersaturated solution at the said temperature range to separate crystalline barium 5'-guanylate pentahydrate.

2. A method as claimed in claim 1 wherein the hot aqueous solution of barium 5'-guanylate has a concentration of 1.5 to 0.3%.

3. A method as claimed in claim 1 wherein the cooling of the hot aqueous solution of barium 5'-guanylate is effected gradually.

4. A method as claimed in claim 1 wherein the pH of the hot aqueous solution of barium 5'-guanylate is about 8.5.

References Cited

UNITED STATES PATENTS

| | | | |
|---|---|---|---|
| 2,549,827 | 4/1951 | Laufer et al. | 260—211.5 |
| 2,909,517 | 10/1959 | De Boer et al. | 260—211.5 |
| 3,190,877 | 1/1965 | Ishibashi et al. | 260—211.5 |
| 3,120,511 | 2/1964 | Tanaka et al. | 260—211.5 |
| 3,157,636 | 11/1964 | Sanno et al. | 260—211.5 |

OTHER REFERENCES

Chambers et al., Jour. Amer. Chem. Soc., vol. 79, 1957, pp. 3747–3752.

LEWIS GOTTS, *Primary Examiner.*

J. R. BROWN, *Assistant Examiner.*